(12) United States Patent
Yamaguchi (10) Patent No.: US 9,996,777 B1
(45) Date of Patent: Jun. 12, 2018

(54) IMAGE FORMING SYSTEM, SERVER, INFORMATION PROCESSING METHOD, AND IMAGE FORMING APPARATUS THAT DECREASE PAPER JAM

(71) Applicant: KYOCERA Document Solutions Inc., Osaka (JP)

(72) Inventor: Keiko Yamaguchi, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days. days.

(21) Appl. No.: 15/436,788

(22) Filed: Feb. 18, 2017

(51) Int. Cl.
  *G06F 3/12* (2006.01)
  *G06K 15/00* (2006.01)
  *H04N 1/00* (2006.01)

(52) U.S. Cl.
  CPC ..... *G06K 15/4085* (2013.01); *G06K 15/4065* (2013.01); *H04N 1/00244* (2013.01); *H04N 2201/0094* (2013.01)

(58) Field of Classification Search
  None
  See application file for complete search history.

(56) References Cited

U.S. PATENT DOCUMENTS

| 5,850,582 A | 12/1998 | Inoo et al. | |
| 2009/0237741 A1* | 9/2009 | Kurahashi | H04N 1/00307 358/406 |
| 2011/0310409 A1* | 12/2011 | Yukumoto | H04N 1/00244 358/1.9 |
| 2012/0194857 A1* | 8/2012 | Yamada | G06F 3/121 358/1.15 |
| 2013/0272725 A1* | 10/2013 | Tanaka | G03G 15/70 399/21 |

FOREIGN PATENT DOCUMENTS

| JP | 08225241 A | * | 9/1996 |
| JP | 2000-132364 A | | 5/2000 |
| JP | 2006-236038 A | | 9/2006 |

* cited by examiner

*Primary Examiner* — Huo Long Chen
(74) *Attorney, Agent, or Firm* — Hawaii Patent Services; Nathaniel K. Fedde; Kenton N. Fedde (57) ABSTRACT

Provided is an image forming system that reduce a paper jam. The system includes an image forming apparatus and a server to manage the image forming apparatus. A paper jam information receiving part in the server receives paper jam information transmitted from the image forming apparatus. A paper jam information analyzing part analyzes paper jam information. A paper jam information analyzing part generates feed-setting changing information when the feed number of the recording paper in the paper feed source where the paper jam occurred corresponds to a threshold and another paper feed source with same settings of a recording paper is present. Feed-setting changing information is information instructed to change into the respective paper feed source. A feed-setting changing information transmitting part transmits feed-setting changing information to the image forming apparatus.

19 Claims, 8 Drawing Sheets

IMAGE FORMING SYSTEM, SERVER, INFORMATION PROCESSING METHOD, AND IMAGE FORMING APPARATUS THAT DECREASE PAPER JAM

BACKGROUND

The present disclosure is especially-associated with an image forming system, a server, an information processing method, and an image forming apparatus that decrease a paper jam.

Image forming apparatuses, such as an MFP (Multifunctional Peripheral,) that can print a document and an image, are present.

Here, as typical technology, a remote maintenance system that can perform maintenance of an image forming apparatus even if a serviceman does not go to the user place is disclosed. In this technology, a control center collects information required for a maintenance from apparatuses having at least a communication function, a printing function, and an address for individual identification, via a network. In the control center, necessary maintenance information is generated based on the collected information. Then, the control center is served to the necessary machine via the network, and the maintenance is performed.

SUMMARY

An image forming system of the present disclosure is an image forming system including an image forming apparatus and a server that performs management of the image forming apparatus. The image forming apparatus includes a feeding part, a paper jam information acquiring part, a paper jam information transmitting part, a feed-setting changing information receiving part, and a feed-setting changing part. The feeding part includes a plurality of paper feed sources holding a recording paper. The paper jam information acquiring part acquires the paper jam information of the feeding part. The paper jam information transmitting part transmits the paper jam information acquired by the paper jam information acquiring part to the server. The feed-setting changing information receiving part receives the feed-setting changing information transmitted by the server. The feed-setting changing part changes the feed-setting of the feeding part corresponding to the feed-setting changing information received by the feed-setting changing information receiving part. The server includes a paper jam information receiving part, a paper jam information analyzing part, and a feed-setting changing information transmitting part. The paper jam information receiving part receives the paper jam information transmitted from the paper jam information transmitting part in the image forming apparatus. The paper jam information analyzing part analyzes the paper jam information received by the paper jam information receiving part, when the feed number of the recording paper in the paper feed source where the paper jam occurred corresponds to a threshold and another paper feed source with same settings of the recording paper is present, generates the feed-setting changing information instructing to change into the respective paper feed source. The feed-setting changing information transmitting part transmits the feed-setting changing information generated by the paper jam information analyzing part to the image forming apparatus.

A server of the present disclosure is a server that manages an image forming apparatus. The server has a paper jam information receiving part, a paper jam information analyzing part, and a feed-setting changing information transmitting part. The paper jam information receiving part receives the paper jam information transmitted from the image forming apparatus. The paper jam information receiving part analyzes the paper jam information received by the paper jam information receiving part, when the feed number of the recording paper in the paper feed source where the paper jam occurred corresponds to a threshold and another paper feed source with same settings of the recording paper is present, generates feed-setting changing information instructing to change into the respective paper feed source. The feed-setting changing information transmitting part transmits the feed-setting changing information generated by the paper jam information analyzing part to the image forming apparatus.

An information processing method of the present disclosure is an information processing method executed by a server that manages an image forming apparatus. In the server, the paper jam information transmitted from the image forming apparatus is received. The received paper jam information is analyzed. When the feed number of the recording paper in the paper feed source where the paper jam occurred corresponds to a threshold and another paper feed source with same settings of the recording paper is present, feed-setting changing information instructing to change into the respective paper feed source is generated. The generated feed-setting changing information is transmitted to the image forming apparatus.

An image forming apparatus of the present disclosure includes a feeding part, a paper jam information acquiring part, a paper jam information analyzing part, and a feed-setting changing part. The feeding part includes a plurality of paper feed sources holding a recording paper. The paper jam information acquiring part acquires one paper jam information of the feeding part. The paper jam information analyzing part analyzes the paper jam information acquired by the paper jam information acquiring part, when the feed number of the recording paper in the paper feed source where the paper jam occurred corresponds to a threshold and another paper feed source with same settings of the recording paper is present, generates feed-setting changing information instructing to change into the respective paper feed source. The feed-setting changing part changes the feed-setting of the feeding part corresponding to the feed-setting changing information generated by the paper jam information analyzing part.

DETAILED DESCRIPTION

First Embodiment

[System Structure of Image Forming System X]

Figure 1:
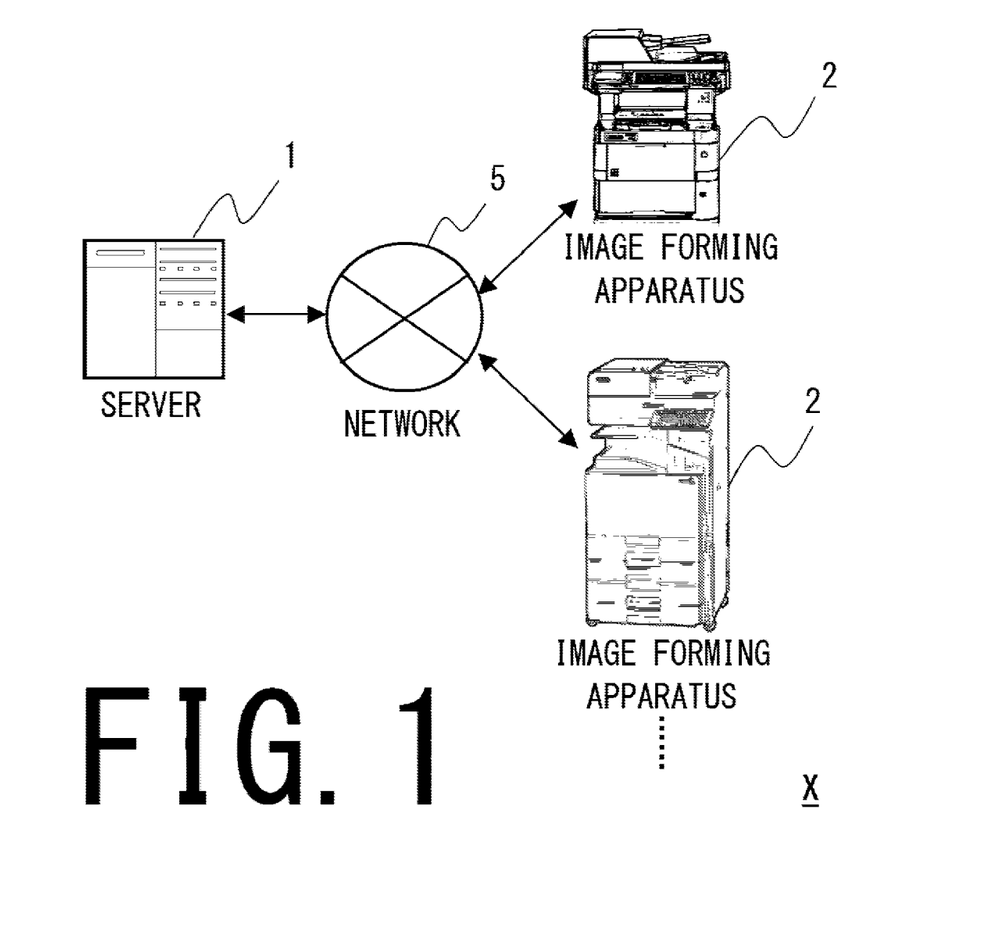
FIG. 1 is a system configuration figure of the image forming system according to a first embodiment in the present disclosure.
Figure 2:
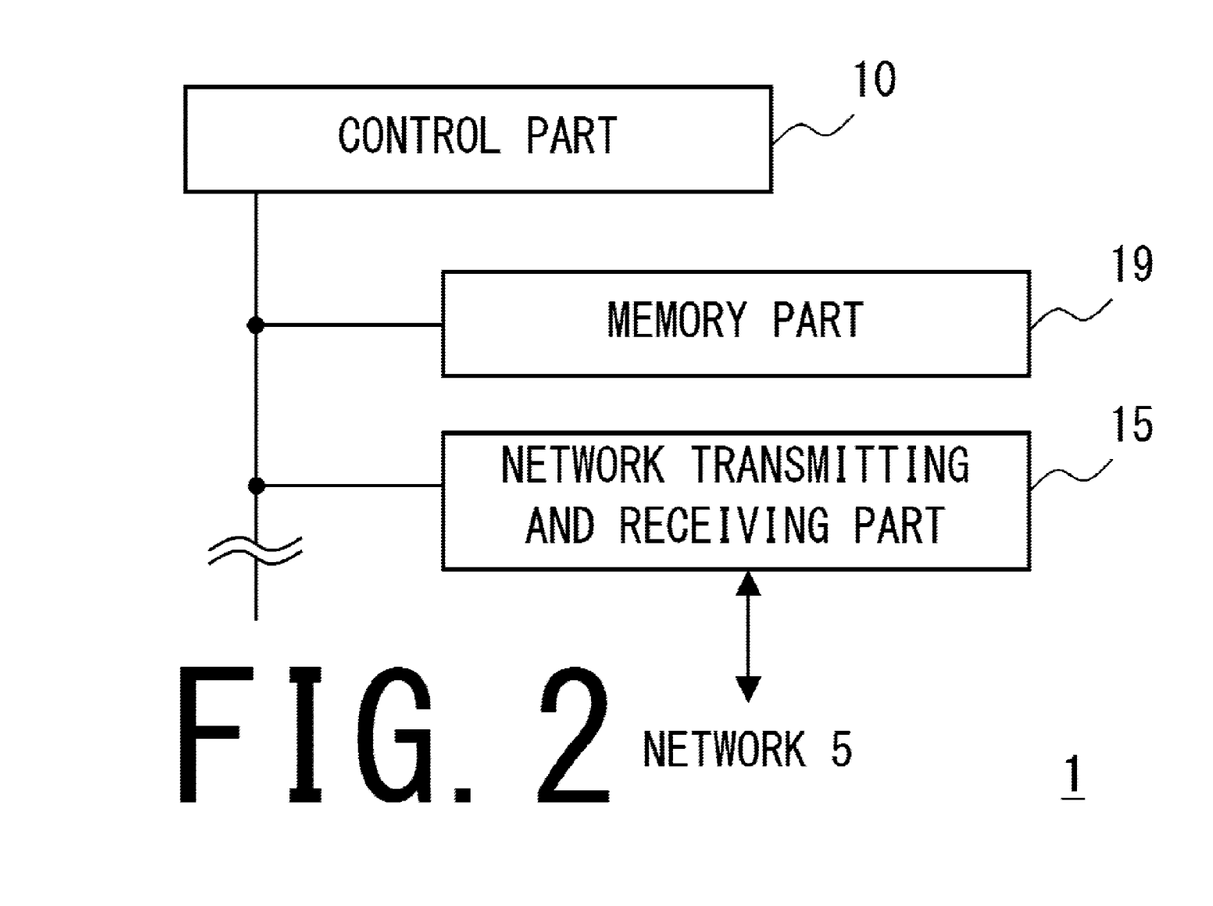
FIG. 2 is a block diagram showing a control configuration of the server as shown in FIG. 1.
Figure 3:
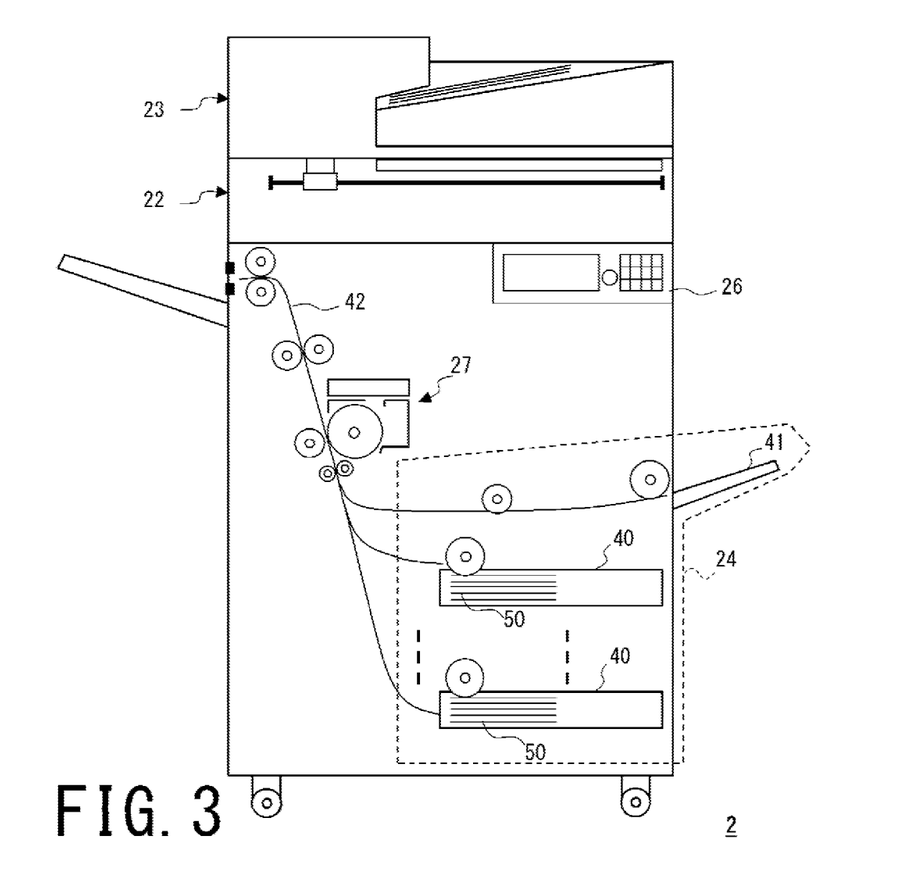
FIG. 3 is a schematic diagram showing an entire configuration of the image forming apparatus as shown in FIG. 1.

First, as refer to FIG. 1-FIG. 3, a system structure of image forming system X according to a first embodiment of the present disclosure is explained. As for image forming system X according to the embodiment of the present disclosure, server 1 and one or more image forming apparatuses 2 are connected with network 5.

Server 1 is a server apparatus that performs remote management for the image forming apparatus 2. In the present embodiment, server 1 is configured to a main frame, a PC (Personal Computer,) or the like. Server 1 collects the generated information of the paper jam, use conditions of recording paper 50 of feeding part 24 (FIG. 3), or the like, from image forming apparatus 2 once per day, for example. Server 1 notifies alteration of a feed-setting, or the like, in image forming apparatus 2 corresponding to the analysis result of the collected data.

Each image forming apparatus 2 is an MFP, a printer, or the like. When a notice is received from server 1, image forming apparatus 2 changes a feed-setting of a feeding part before performing the next printing. Thereby, frequent occurrence of a paper jam can be prevented.

Network 5 is LAN (Local Area Network), WAN (Wide Area Network,) or the like. Also, network 5 may be connected to the Internet (registered trademark,) and a mobile phone network via router, a gateway, or the like.

Then, as refer to FIG. 2, server 1 includes control part 10, network transmitting and receiving part 15, and memory part 19.

Control part 10 includes a CPU (Central Processing Uni,) a GPU (Graphics Processing Unit,) or the like. Control part 10 reads a control program stored in an auxiliary memory part of memory part 19. Then, control part 10 expands the control program in a main memory part, executes it, is operated as each part of a functional block as describe later.

Network transmitting and receiving part 15 is connected with network 5.

Memory part 19 is a storage having a non-transitory recording medium. Memory part 19 may include the main memory part and the auxiliary memory part. Memory part 19 may include various RAM (Random Access Memory,) or the like, as the main memory part. Also, memory part 19 may include ROM (Read Only Memory,) a flash memory, HDD (Hard Disk Drive,) or the like, as the auxiliary memory part. In this case, the control program for operation-controlling server 1 is stored in the auxiliary memory part of memory part 19. Also, memory part 19 may include external storage, such as various flash memories and an optical recording medium.

In addition, control part 10 may also include non-transitory recording medium, such as RAM, ROM, a flash memory, or the like.

Figure 4:
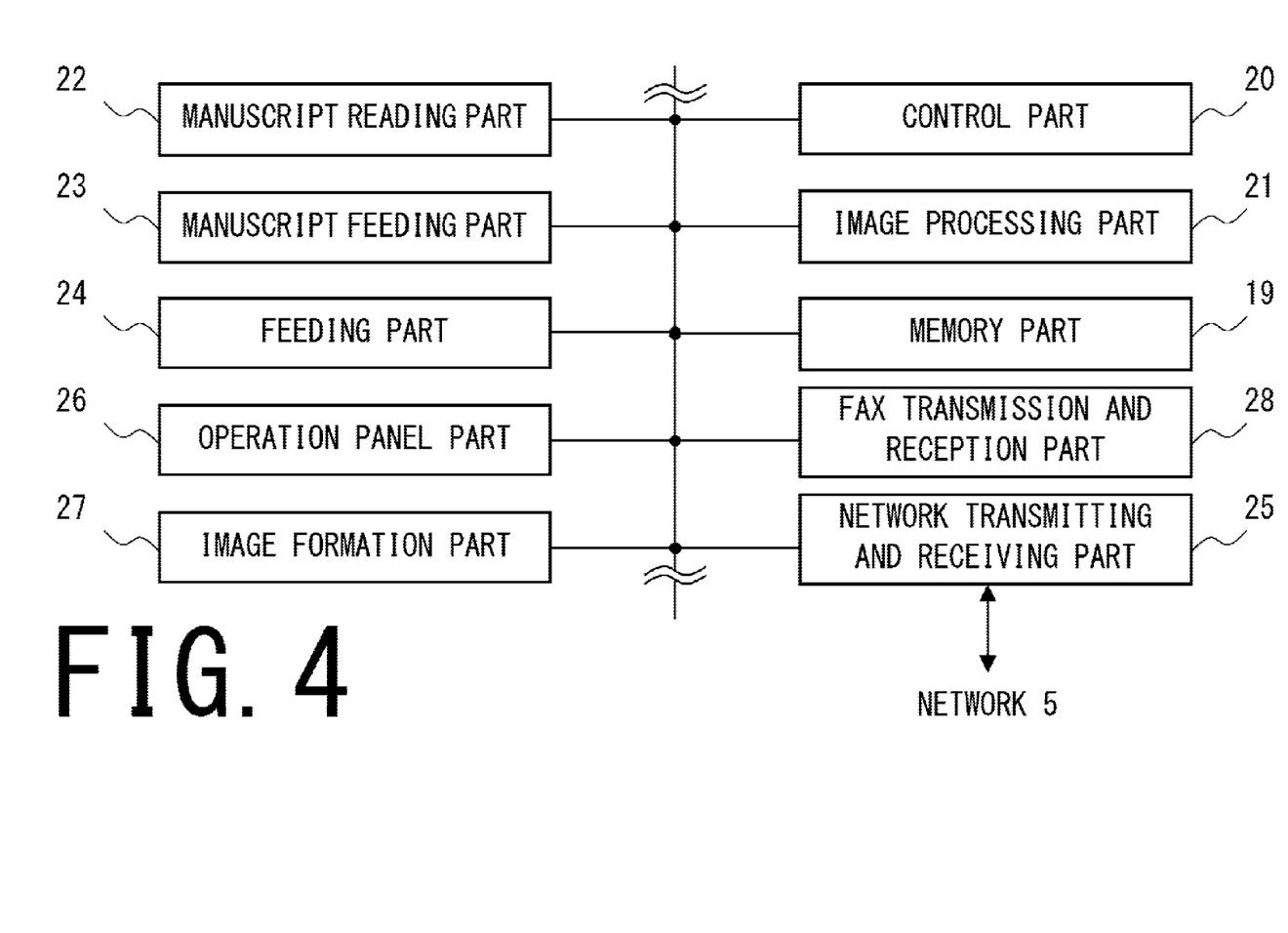
FIG. 4 is a block diagram showing a control configuration of the image forming apparatus as shown in FIG. 1.

Then, as refer to FIG. 3 and FIG. 4, image forming apparatus 2 includes image processing part 21, manuscript reading part 22, manuscript feeding part 23, feeding part 24, network transmitting and receiving part 25, operation panel part 26, image formation part 27, FAX transmission and reception part 28, memory part 29, or the like. Each part is connected to control part 20, and control part 20 operation-controls them.

Control part 20 is a CPU or the like. Control part 20 reads the control program stored in an auxiliary memory part of memory part 29. Then, control part 20 expands a control program to a main memory part, executes it, and is operated as each parts of a functional block as described later. Also, control part 20 controls a whole device corresponding to the specified instructions information inputted from an external terminal, operation panel part 26, or the like.

Image processing part 21 is a control part specifying for image processing. Image processing part 21 performs various image processing for image data. These image processing are, for example, image quality improvement of blank page detection, enlarging-or-contracting, rotation, density control, gradation adjustment, noise rejection, sharpness, or the like. Also, image processing part 21 stores an image read by manuscript reading part 22 in memory part 29 as print data. In this case, image processing part 21 can also convert the print data into a file with various formats.

Manuscript reading part 22 scans a set manuscript. Also, manuscript reading part 22 is arranged in the upper part of the body part in image forming apparatus 2. Manuscript reading part 22 may include a scanner, a platen glass, and a manuscript reading slit. Manuscript reading part 22 moves the scanner to a location that faces platen glass, when reading the manuscript placed on platen glass. Then, manuscript reading part 22 reads the manuscript placed on platen glass with scanning. Thereby, manuscript reading part 22 obtains an image data and outputs the obtained image data to control part 20.

Also, manuscript reading part 22 moves the scanner to a position that faces the manuscript reading slit, when reading the manuscript fed from manuscript feeding part 23. Then, manuscript reading part 22 reads the manuscript via the manuscript reading slit. In this case, manuscript reading part 22 reads the manuscript as synchronized with the conveying action of the manuscript by manuscript feeding part 23 and then obtains image data. Manuscript reading part 22 outputs the obtained image data to control part 20.

Manuscript feeding part 23 conveys the manuscript read by manuscript reading part 22. Manuscript feeding part 23 is allocated in the upper part of manuscript reading part 22. Manuscript feeding part 23 has s manuscript mounting part and a manuscript transport mechanism. Manuscript feeding part 23 feeds out one manuscript placed on the manuscript mounting part at a time by the manuscript transport mechanism and feeds it to manuscript reading part 22.

Feeding part 24 feeds out one sheet of recording paper 50 at a time towards image formation part 27 via conveyance part 42. Feeding part 24 is provided in the body part. The configuration of feeding part 24 and conveyance part 42 is described later.

Network transmitting and receiving part 25 is a network connection part including a LAN board, a wireless transmitter receiver, or the like, for connecting with network 5. Network transmitting and receiving part 25 transmits and receives data in a communication data line, and transmits and receives an audio signal in a voice call line.

Operation panel part 26 has an input part and a display part. Also, operation panel part 26 is arranged to the front-side of image forming apparatus 2. The input part in operation panel part 26 includes buttons, a touch panel, or the like. The buttons of the input part are a button for a numeric keypad, a start, cancel, switching of operational mode, performing instructions related to executing of a job, or the like. The operational mode may be the mode of a copy, FAX transmission, a scanner, a network scanner, or the like. Also, the job may be types, such as printing, transmitting, storing, and recording for the selected document. The input part in operation panel part 26 can acquire instructions of the various jobs for image forming apparatus 2 by a user. Also, by user instructions acquired from the input part in operation panel part 26, it is also possible to input and change each user information. The display part in operation panel part 26 is LCD (Liquid Crystal Display,) an organic electroluminescence display, or the like.

Image formation part 27 performs the image formation of data, which is stored in memory part 29, read by manuscript reading part 22, or acquired from the external terminal, by the user output instruction to recording paper 50. Image formation part 27 includes a photo conductor drum, an exposure part, a developing part, a transfer part, a fixing part, or the like. Image formation part 27 records a toner image on recording paper 50 by executing an image formation process including electrification, exposure, development, transfer, and fixing.

FAX transmission and reception part 28 transmits and receives a facsimile. FAX transmission and reception part 28 receives a facsimile from other FAX equipment via a sound line, stores it at memory part 29, and performs image formation by image formation part 27. Also, FAX transmission and reception part 28 can convert a manuscript read by manuscript reading part 22, convert data of network FAX transmitted from the external terminal into image data, and perform facsimile transmission to other FAX equipment via the sound line.

Memory part 29 is a storage having a non-transitory recording medium. Memory part 29 may include various RAM (Random Access Memory,) or the like, as a main memory part. Also, memory part 19 may include ROM (Read Only Memory,) a flash memory, HDD (Hard Disk Drive,) or the like, as an auxiliary memory part. In this case, the control program for operation-controlling image forming apparatus 2 is stored in the auxiliary memory part in memory part 19. Also, ID information, such as a model name and a serial number, may be stored in memory part 29. In addition, memory part 29 may also store user account settings. Also, the area of the document box (a storage folder, or a shared folder) for each user may be included in memory part 29.

Also, feeding part 24 includes a plurality of sheet paper cassettes 40 and detachable tray 41, and it is connected with conveyance part 42.

Sheet paper cassette 40 holds recording paper 50. A type of recording paper 50 held in sheet paper cassette 40 is, for example, a fine quality paper, a label paper, coated paper, recycled paper, or the like. Detachable tray 41 is a tray, or the like, in which a user inserts recording paper 50 by hand feed. Detachable tray 41 may hold a smaller quantity recording paper 50 as compared with sheet paper cassette 40. Also, detachable tray 41 may keep a type of recording papers 50 that cannot be held in sheet paper cassette 40, such as a card, an envelope, a cardboard, an embossed paper, and a bright film. Also, detachable tray 41 may be retracted in a body part when not using. Either of sheet paper cassette 40 or detachable tray 41 is set to a paper feed source by control part 20 (FIG. 3) in the body part as described later. Also, various kinds of sensors may be provided in feeding part 24 and conveyance part 42. The sensor can be used to determine where the paper is jammed in the paper sheet conveying path. The sensor may be a photo sensor, a mechanical sensor, or a torque sensor.

Conveyance part 42 includes a feed roller, a conveying roller pair, a resist roller pair, and an ejection roller pair. The plurality of feed rollers is provided. Each feed roller may feed out one sheet of recording paper 50 at a time to a paper sheet conveying path from any one of sheet paper cassette 40 or detachable tray 41. The conveying roller pair directs and conveys recording paper 50, which is fed out to the paper sheet conveying path by the feed roller, to image formation part 27. The resist roller pair controls the timing of recording paper 50, which is conveyed by the conveying roller pair, to be recorded. Then, image formation part 27 performs image formation of recording paper 50, which the timing is controlled by the resist roller pair. The ejection roller pair discharges recording paper 50, which the image formation is performed by image formation part 27, from discharge opening to a discharging tray. Also, conveyance part 42 inputs signals from various sensors, such as the photo sensor, the mechanical sensor, and the torque sensor for each roller. Thereby, when a paper jam occurs, it can be detected where recording paper 50 is present.

In addition, in image forming apparatus 2, control part 20, and image processing part 21 may be integrally formed as like CPU with built-in GPU, a chip-on module package, or the like. Also, control part 20 and image processing part 21 may include non-transitory recording medium, such as RAM, ROM, a flash memory, or the like.

[The Functional Configuration of Image Forming System X]

Figure 5:
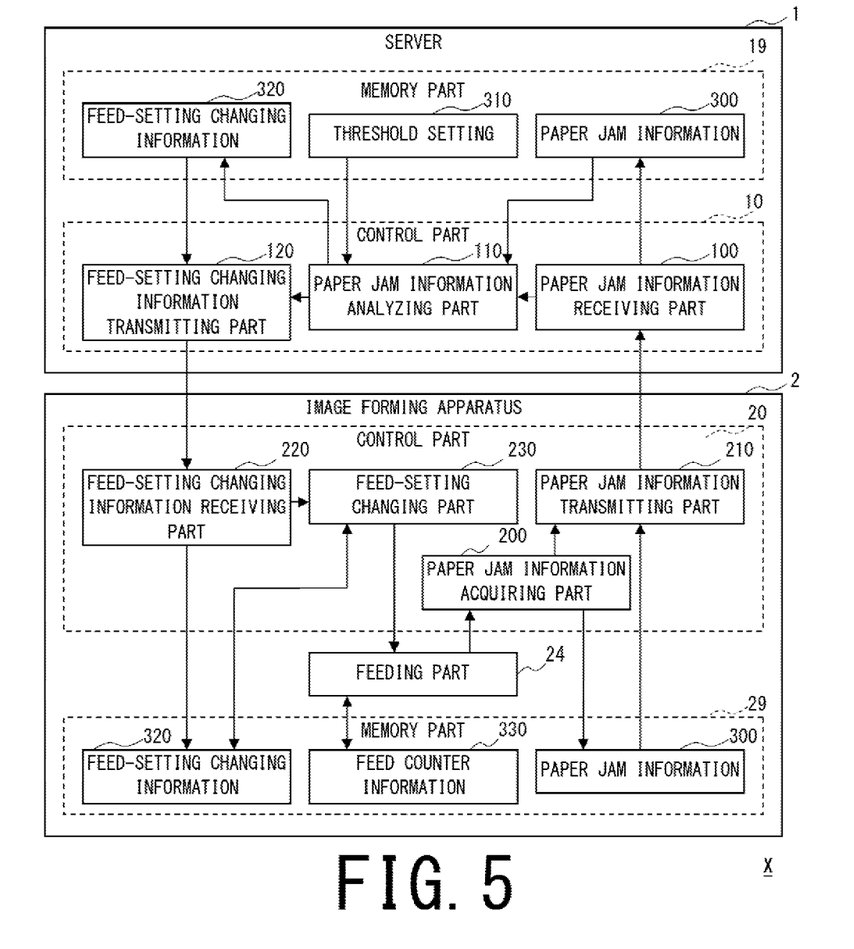
FIG. 5 is a block diagram showing a functional configuration of the image forming system according to the first embodiment in the present disclosure.

Here, as refer to FIG. 5, the functional configuration of server 1 and image forming apparatus 2 in image forming system X are explained. Control part 10 in server 1 includes paper jam information receiving part 100, paper jam information analyzing part 110, and feed-setting changing information transmitting part 120. Memory part 19 in server 1 may store paper jam information 300, threshold setting 310, and feed-setting changing information 320. Control part 20 in image forming apparatus 2 includes paper jam information acquiring part 200, paper jam information transmitting part 210, feed-setting changing information receiving part 220, and feed-setting changing part 230. Memory part 29 in image forming apparatus 2 may store paper jam information 300 and feed-setting changing information 320.

Paper jam information receiving part 100 receives paper jam information 300 transmitted from paper jam information transmitting part 210 in image forming apparatus 2.

Paper jam information analyzing part 110 analyzes paper jam information 300 received by paper jam information receiving part 100. Paper jam information analyzing part 110 determines whether or not feed number of recording paper 50 in the paper feed source where a paper jam occurred corresponds to a threshold included in threshold setting 310. Then, if it corresponds to the threshold, paper jam information analyzing part 110 determines whether or not another paper feed source having same settings of recording paper 50 is present. If there is the paper feed source having the same settings, paper jam information analyzing part 110 generates feed-setting changing information 320, which is instructed to change into the respective paper feed source. In this case, paper jam information analyzing part 110 may use the different thresholds in threshold setting 310 for sheet paper cassette 40 and for detachable tray 41. Also, paper jam information analyzing part 110 may change the threshold according to the type of recording paper 50 held on any one of the plurality of sheet paper cassette 40 or detachable trays 41, which is the paper feed source of feeding part 24.

Feed-setting changing information transmitting part 120 transmits feed-setting changing information 320 generated by paper jam information analyzing part 110 to image forming apparatus 2.

Paper jam information acquiring part 200 acquires paper jam information 300 in feeding part 24. For example, paper jam information acquiring part 200 refers to the feed counter information 330. Then, paper jam information acquiring part 200 analyzes where the paper jam occurred by using the information of the sensors, or the like. That is, paper jam information acquiring part 200 analyzes whether the paper jam occurred at any one of sheet paper cassette 40 or detachable tray 41 in feeding part 24, or it is occurred in another part in the carrying path. Thereby, paper jam information acquiring part 200 generates paper jam information 300 and stores it in memory part 29, temporarily.

Paper jam information transmitting part 210 transmits paper jam information 300 acquired by paper jam information acquiring part 200 to server 1. Thus, paper jam information transmitting part 210 transmits paper jam information 300 temporarily-stored in memory part 29 from network transmitting and receiving part 25.

Feed-setting changing information receiving part 220 receives feed-setting changing information 320 transmitted by server 1. In this case, feed-setting changing information receiving part 220 stores in memory part 29 if feed-setting changing information 320 is received.

Feed-setting changing part 230 changes the feed-setting of feeding part 24 corresponding to feed-setting changing information 320 received by feed-setting changing information receiving part 220. For example, feed-setting changing part 230 changes the paper feed source of feed counter information 330 stored in memory part 29 as correspond to feed-setting changing information 320.

Paper jam information 300 is information for analyzing the paper jam of feeding part 24. Paper jam information 300 may include, such as, occurring time of a paper jam, a model name and a serial number, occurring place of the paper jam, paper jam cause code, ID (identification) of sheet paper cassette 40 or detachable tray 41, which is the paper feed source, and setting information of all the paper cassette 40 and detachable tray 41 in image forming apparatus 2, or the like. The setting information may be selected and included information of the size, the type, the feed counter, or the like, for recording paper from feed counter information 330. In addition, a configuration is also possible that a configuration that information of feed counter information 330 may not be included in paper jam information 300 and transmit it to server 1, separately.

Threshold setting 310 includes a threshold of durable number of sheets for sheet paper cassette 40 or detachable tray 41 in the paper feed source where the paper jam occurred. For example, durable number of sheets may select the shortest term of the durable number of sheets for a component in sheet paper cassette 40 or detachable tray 41 used for feeding. Also, the durable number of sheets may be determined as a number of sheets that a paper jam occurs in specific frequency at a time of feeding of recording paper 50. Also, the threshold of durable number of sheets can be used as it is, or it may be adjusted smaller or larger, or the like, by an administrator of image forming apparatus 2. Thereby, for example, if the threshold of durable number of sheets is set smaller as like 80%, it becomes maintainable before a paper jam occurs, frequently, and down time can be decreased. Also, for example, if the thresholds of durable number of sheets is set larger as like 120%, the frequency of a paper jam may be higher, slightly, but a maintenance cost is reducible.

Also, threshold setting 310 may include the threshold corresponding to the ratio of the feed counter between sheet paper cassette 40 or detachable tray 41, which is the paper feed source where the paper jam occurred, and another sheet paper cassette 40 or detachable tray 41. For example, this threshold can be set that the feed counter of sheet paper cassette 40 or detachable tray 41, which is a paper feed source, is set to 1, and the feed counter of the other sheet paper cassettes 40 or detachable tray 41 is set to 0.5 or less. In addition, in this case, "the feed counter of the other sheet paper cassettes 40 or detachable tray 41" is the average of all the other sheet paper cassettes 40 or detachable tray 41 or least value of them. Thereby, it can pay attention to the administrator of image forming apparatus 2 that the frequency in use of sheet paper cassettes 40 or detachable tray 41 inclines, as described later.

Also, in threshold setting 310, the threshold of detachable tray 41, which is differs from the threshold of sheet paper cassette 40, may be used. For example, in detachable tray 41, the type of fed recording paper 50 is increased, comparatively. Thereby, the occurrence frequency of the paper jam for detachable tray 41 becomes higher. Therefore, the threshold of detachable tray 41 may be set more greatly than the threshold of sheet paper cassette 40. For detachable tray 41, it is considered that, in many cases, a paper jam occurred in detachable tray 41 is caused by the paper itself as compared with the fatigue of the rubber on the outer circumference of a feed roller. That is, the correlation the feed number of sheets in recording paper 50 with the degradation of the feed roller may be smaller than that of sheet paper cassette 40. In addition, for example, in a case of a model of the apparatus, or the like, where degradation of the feed roller occurs easily because of feeding a many different type of paper, the threshold of detachable tray 41 may be smaller than the threshold of sheet paper cassette 40.

Also, in threshold setting 310, different thresholds may be used by the type of recording paper 50 held on sheet paper cassette 40 or detachable tray 41 in each paper feed source. That is, the threshold may be changed not only corresponding to the feed number of sheets from each cassette but corresponding to the feed counter according to a kind of the paper. Thereby, it is possible to set more accurate threshold.

Also, the threshold of the feed counter of sheet paper cassette 40 or detachable tray 41 serving as a paper feed source can be used the previously-set value or can be set by server 1 by using the analysis result of paper jam information 300. Here, these thresholds may be used the preset value corresponding to each image forming apparatus 2, or may be changed, dynamically, based on the paper jam information 300, which server 1 is collected, or the like.

Feed-setting changing information 320 includes a command to image forming apparatus 2 that changes sheet paper cassette 40 or detachable tray 41 for the paper feed source, or the like.

Feed counter information 330 is attribution information of the feed-setting and the feed number of recording paper 50, which is held in each sheet paper cassette 40 or detachable tray 41 in feeding part 24. The attribution information includes information about a size, a type, direction, a feed counter, or the like, of recording paper 50 held in sheet paper cassette 40 or detachable tray 41. Among these, the feed counter is the number of times that recording paper 50 is fed from the respective sheet paper cassette 40 or detachable tray 41, and, that is, the feed number. The feed number may be reset and be set to zero when a service person, or the like, is maintained the respective sheet paper cassette 40 or detachable tray 41. Also, feed counter information 330 include the feed-setting. The feed-setting is a setting of the paper feed source, which sheet paper cassette 40 or detachable tray 41 in feeding part 24 feeds the recording paper 50.

Here, control part 10 in server 1 executes the control program stored in memory part 19 and is functioned as paper jam information receiving part 100, paper jam information analyzing part 110, and feed-setting changing information transmitting part 120. Also, control part 20 in image forming apparatus 2 executes the control program stored in memory part 29 and is functioned as paper jam information acquiring part 200, paper jam information transmitting part 210, feed-setting changing information receiving part 220, and feed-setting changing part 230. Also, as above-mentioned, each part of server 1 and image forming apparatus 2 becomes hardware resources that execute the image forming method in the present disclosure.

[Paper Jam Feed-Setting Changing Process by Image Forming System X]

Figure 6:
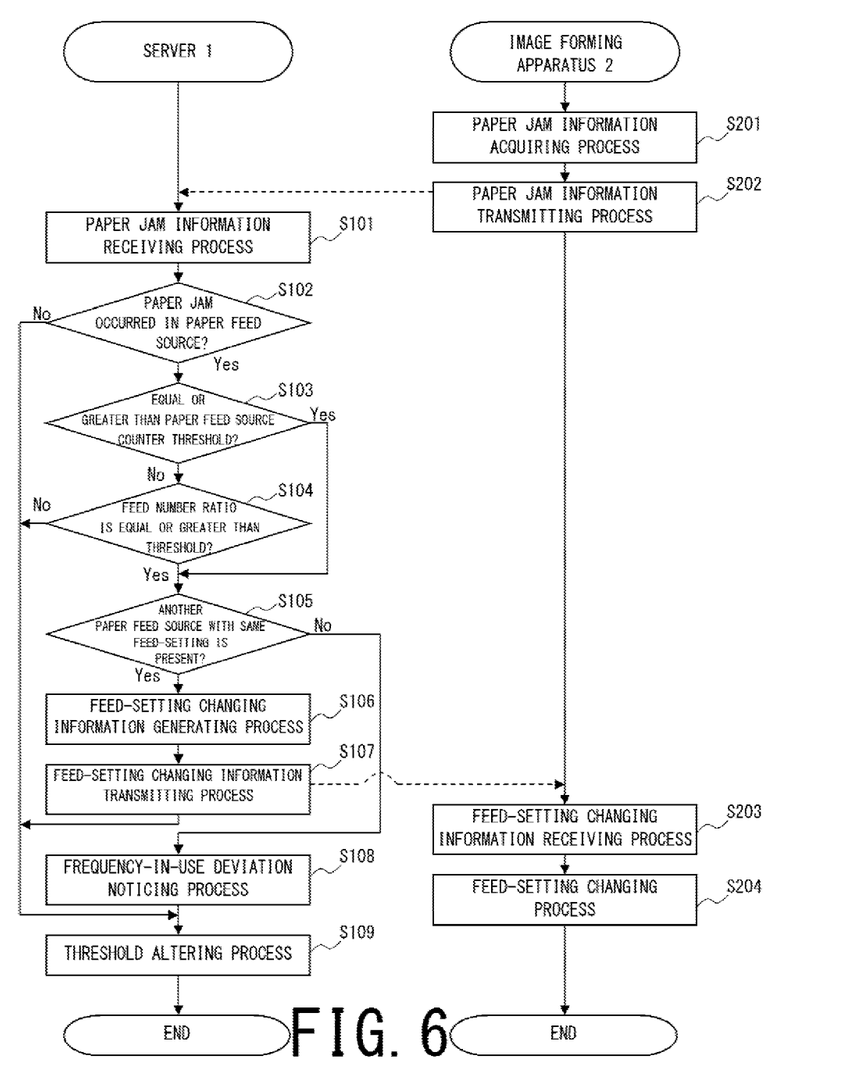
FIG. 6 is a flow chart of the paper jam feed-setting changing process according to the first embodiment in the present disclosure.

Then, as refer to FIG. 6, the paper jam feed-setting changing process by image forming system X according to the present embodiment in the present disclosure is explained. In the paper jam feed-setting changing process in the present embodiment, control part 10 and control part 20 in server 1 and image forming apparatus 2 mainly executes the program memorized in memory part 19 and memory part 29 as collaborated with each part by using the hardware resources. In the following, with reference to the flow chart of FIG. 6, the details of the paper jam feed-setting changing process are explained for each step.

(Step S201)

Firstly, paper jam information acquiring part 200 in image forming apparatus 2 performs a paper jam information acquiring process. Paper jam information acquiring part 200 acquires paper jam information 300 in feeding part 24. In detail, paper jam information acquiring part 200 acquires current time including date, hour, minute, second from a built-in clock in image forming apparatus 2, a network time server, or the like, and sets it as a paper jam occurring time to paper jam information 300 in memory part 29. Also, paper jam information acquiring part 200 determines a paper jam occurrence place and the cause of the paper jam by the information of the various sensors in conveyance part 42 and sets the paper jam generation place and the paper jam cause code to paper jam information 300. Also, paper jam information acquiring part 200 sets ID of sheet paper cassette 40 or detachable tray 41, which is the paper feed source in this time, to paper jam information 300. Also, paper jam information acquiring part 200 acquires all the setting information of sheet paper cassettes 40 and detachable tray 41 in image forming apparatus 2 from feed counter information 330 and sets it to paper jam information 300.

(Step S202)

Then, paper jam information transmitting part 210 performs a paper jam information transmitting process. Paper jam information transmitting part 210 transmits paper jam information 300 acquired by paper jam information acquiring part 200 to server 1.

(Step S101)

Here, paper jam information receiving part 100 in server 1 performs a paper jam information receiving process. Paper jam information receiving part 100 receives paper jam information 300 transmitted by paper jam information transmitting part 210 in image forming apparatus 2 and stores it in memory part 19.

(Step S102)

Then, paper jam information analyzing part 110 determines whether or not the paper jam is occurred in sheet paper cassette 40 or detachable tray 41, which is the paper feed source. In detail, paper jam information analyzing part 110 refers to paper jam information 300 and obtains the paper jam occurrence place, the paper jam cause code, and ID of the paper feed source in this time. Thereby, paper jam information analyzing part 110 determines Yes if it can be recognized that the paper jam is occurred in the paper feed source. Paper jam information analyzing part 110 determines No if other case.

In Yes, paper jam information analyzing part 110 advances a process to Step S103.

In No, paper jam information analyzing part 110 ends a feed-setting changing process.

(Step S103)

If the paper jam has occurred in the paper feed source, paper jam information analyzing part 110 determines whether or not the feed counter of a paper feed source is greater than or equal to the threshold. Paper jam information analyzing part 110 refers threshold setting 310. Paper jam information analyzing part 110 determines Yes if the feed counter is greater than or equal to the threshold of durable number of sheets. This feed counter is for sheet paper cassette 40 or for detachable trays 41, which is the paper feed source in this time, and is included in paper jam information 300. Paper jam information analyzing part 110 determines No if the other case.

In Yes, paper jam information analyzing part 110 advances a process to Step S105.

In No, paper jam information analyzing part 110 advances a process to Step S104.

(Step S104)

If it is not greater than or equal to the threshold of durable number of sheets, paper jam information analyzing part 110 determines whether or not it is greater than or equal to the threshold of the ratio between the current paper feed source and the other paper feed source. Paper jam information analyzing part 110 refers to the threshold setting 310. Paper jam information analyzing part 110 determines Yes if a ratio between the feed counter of sheet paper cassette 40 or detachable tray 41, which is the paper feed source in this time, and a feed counter of sheet paper cassette 40 or detachable tray 41, which is the other than the paper feed source in this time, is greater than or equal to a corresponding threshold. Also, these feed counters are included in paper jam information 300. Paper jam information analyzing part 110 determines No if the other case.

In Yes, paper jam information analyzing part 110 advances a process to Step S105.

In No, paper jam information analyzing part 110 advances a process to Step S109.

(Step S105)

Here, if it is greater than or equal to each threshold of threshold setting 310, paper jam information analyzing part 110 determines whether or not there is any another paper feed source of the feed-setting. Paper jam information analyzing part 110 refers to the setting information of all the sheet paper cassettes 40 and detachable trays 41 included in paper jam information 300. Then, paper jam information analyzing part 110 determines Yes, if sheet paper cassette 40 or detachable tray 41 with the setting of same size and type of recording paper is present. Paper jam information analyzing part 110 determines No if other.

In Yes, paper jam information analyzing part 110 advances a process to Step S106.

In No, paper jam information analyzing part 110 advances a process to Step S108.

(Step S106)

If there is another paper feed source with the same feed-setting, paper jam information analyzing part 110 performs feed-setting changing information generating process. Paper jam information analyzing part 110 generates feed-setting changing information 320 that makes the paper feed source of image forming apparatus 2 change. For example, paper jam information analyzing part 110 generates a command to image forming apparatus 2 as feed-setting changing information 320 and stores it in memory part 19. This command may include an instruction that makes sheet paper cassette 40 or detachable tray 41 of a paper feed source cancel, or the like. The command may also include an instruction that changes the paper feed source to the other sheet paper cassettes 40 or detachable trays 41 having the same feed-setting, or the like. Also, paper jam information analyzing part 110 may notify the feed-setting having been changed to the administrator of image forming apparatus 2. Paper jam information analyzing part 110 may perform this notice by using an e-mail, a messenger, or the like.

In addition, steps S102-S106 executed by paper jam information analyzing part 110 serve as a paper jam information analyzing process.

(Step S107)

Then, feed-setting changing information transmitting part 120 performs a feed-setting changing information transmitting process. Feed-setting changing information transmitting part 120 transmits feed-setting changing information 320 to image forming apparatus 2. As mentioned above, feed-setting changing information 320 is information that is generated by paper jam information analyzing part 110 and is stored in memory part 19.

(Step S203)

Here, feed-setting changing information receiving part 220 in image forming apparatus 2 performs a feed-setting changing information receiving process. If feed-setting changing information 320 is transmitted from feed-setting changing information transmitting part 120 in server 1, feed-setting changing information receiving part 220 receives this data and stores in memory part 29.

(Step S204)

Then, feed-setting changing part 230 performs a feed-setting changing process. Feed-setting changing part 230 changes the feed-setting of feeding part 24 corresponding to feed-setting changing information 320 received by feed-setting changing information receiving part 220. Feed-setting changing part 230 changes the feed-setting of feed counter information 330 to the other sheet paper cassettes 40 or detachable trays 41, which is included in feed-setting changing information 320.

Subsequently, feed-setting changing part 230 ends the process of image forming apparatus 2 for the paper jam feed-setting changing process.

(Step S108)

If there is no other paper feed source with the same feed-setting, paper jam information analyzing part 110 performs a frequency-in-use deviation noticing process. Paper jam information analyzing part 110 notifies to the administrator of image forming apparatus 2 that the frequency in use of sheet paper cassette 40 or detachable tray 41, which is the paper feed source in this time, is one-sided. Thereby, attention is called. Thus, it is possible the administrator changes feed-setting for sheet paper cassette 40 or detachable tray 41, manually.

(Step S109)

Here, paper jam information analyzing part 110 performs a threshold altering process. Paper jam information analyzing part 110 changes each threshold, the durable value, or the like, in threshold setting 310 stored in memory part 19 by the result of the paper jam information analyzing process, or the like. As mentioned above, paper jam information analyzing part 110 may adopt them to the user environment by the feed-setting of the paper feed source included in paper jam information 300.

By the above-mentioned, the paper jam feed-setting changing process according to the present embodiment is ended.

The following effects can be obtained with a configuration as mentioned above.

In a typical image forming apparatus, durable number of sheets is set for each component of sheet paper cassette used for feeding. If it exceeds or approaches to the durable number of sheets, feeding will not work well, and it occurs a paper jam, frequently. In case that the paper jams occurred frequently, the parts replacement by a service person is required, and the down time where a user cannot use the image forming apparatus is occurred. However, in a typical technology, it is not considered about the deviation of the frequency in use of sheet paper cassette.

On the other hand, image forming system X according to the first embodiment in the present disclosure includes image forming apparatus 2 and server 1 manages image forming apparatus 2. Image forming apparatus 2 includes feeding part 24, paper jam information acquiring part 200, paper jam information transmitting part 210, and feed-setting changing part 230. Feeding part 24 includes a plurality of paper feed sources holding recording paper 50. Paper jam information acquiring part 200 acquires paper jam information 300 of feeding part 24. Paper jam information transmitting part 210 transmits paper jam information 300 acquired by paper jam information acquiring part 200 to server 1. Feed-setting changing information receiving part 220 receives feed-setting changing information 320 transmitted from server 1. Feed-setting changing part 230 changes the feed-setting of feeding part 24 corresponding to feed-setting changing information 320 received by feed-setting changing information receiving part 220. Server 1 includes paper jam information receiving part 100, paper jam information analyzing part 110, and feed-setting changing information transmitting part 120. Paper jam information receiving part 100 receives paper jam information 300 transmitted from paper jam information transmitting part 210 of image forming apparatus 2. Paper jam information analyzing part 110 analyzes paper jam information 300 received by paper jam information receiving part 100, when the feed number of recording paper 50 in the paper feed source where the paper jam occurred corresponds to a threshold and another paper feed source with same settings of recording paper 50 is present, generates feed-setting changing information 320 instructed to change into the respective paper feed source. Feed-setting changing information transmitting part 120 transmits feed-setting changing information 320 generated by paper jam information analyzing part 110 to image forming apparatus 2.

As configured in this way, use of one-sided sheet paper cassette 40 or detachable tray 41 can be prevented as corresponded to the use condition in each sheet paper cassette 40 or detachable tray 41. Thereby, a feed-setting can be optimized as sheet paper cassette 40 or detachable tray 41 with little frequency in use may be used, effectively. Thus, the frequency of a paper jam can be reduced.

Also, image forming system X according to a first embodiment of the present disclosure, threshold setting 310 includes a threshold corresponding to durable number of sheets of the paper feed source where the paper jam occurred and/or the ratio of the feed counter for the paper feed source where the paper jam occurred, and for another paper feed source.

As configured in this way, not only warning the feed counter exceeds the durable number of sheets but also making the paper feed source, which is not used well, use is possible. Therefore, sheet paper cassette 40 or detachable tray 41 is used effectively, and the frequency of a paper jam can be reduced.

Also, image forming system X according to the first embodiment of the present disclosure, the plurality of paper feed sources includes sheet paper cassette 40 and detachable tray 41, and paper jam information analyzing part 110 uses the different thresholds between sheet paper cassette 40 and detachable tray 41.

As configured in this way, even if a rarely-used sheet paper cassette 40 and detachable tray 41 are present, it can be used, effectively. Therefore, the frequency of a paper jam can be reduced.

Also, image forming system X according to the first embodiment in the present disclosure, paper jam information analyzing part 110 changes a threshold according to the type of recording paper 50 held on each paper feed source.

As configured in this way, the threshold more adopted with actual endurance status can be set, and a maintenance can be optimized.

Also, image forming system X according to the first embodiment in the present disclosure, paper jam information analyzing part 110 analyzes paper jam information 300 acquired from a plurality of image forming apparatuses 2, and the threshold is changed as matched to user environment.

As configured in this way, the maintenance corresponded to the user environment is possible, and it can reduce the frequency of a paper jam.

Second Embodiment

Figure 7:
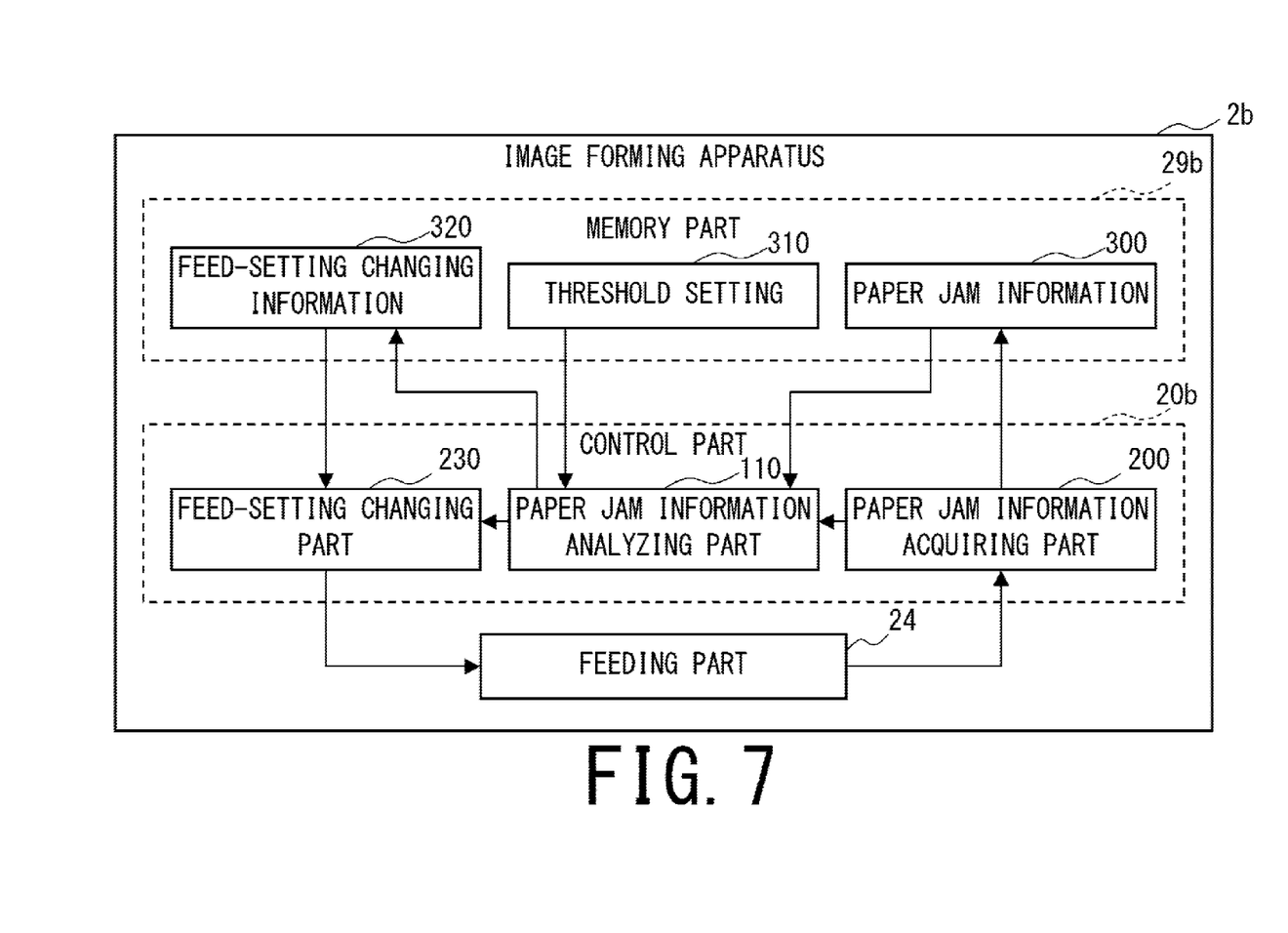
FIG. 7 is a block diagram showing a function configuration of the image forming apparatus according to the second embodiment in the present disclosure.

Here, as refer to FIG. 7, stand-alone image forming apparatus 2b is explained in a second embodiment in the present disclosure.

As above-mentioned first embodiment, an example that performs to change sheet paper cassette 40 or detachable tray 41 used in image forming apparatus 2, which a remote management is performed by server 1 via network 5, is explained.

On the other hand, the present disclosure is also applicable other than the remotely-managed apparatus.

In detail, image forming apparatus 2b includes feeding part 24, paper jam information acquiring part 200, paper jam information analyzing part 110, and feed-setting changing part 230. Feeding part 24 includes a plurality of paper feed sources holding recording paper 50. Paper jam information acquiring part 200 acquires paper jam information 300 in feeding part 24. Paper jam information analyzing part 110 analyzes paper jam information 300 acquired by paper jam information acquiring part 200 as refer to threshold setting 310. Paper jam information analyzing part 110, when the feed number of recording paper 50 in the paper feed source where the paper jam occurred is greater than or equals to a specific threshold and another paper feed source with same settings of recording paper 50 is present, generates feed-setting changing information 320 instructed to change into the respective paper feed source. Feed-setting changing part 230 changes the feed-setting of feeding part 24 corresponding to feed-setting changing information 320 generated by paper jam information analyzing part 110.

Among these, the similar symbol in FIG. 5 is a similar configuration.

Also, control part 10b in image forming apparatus 2b executes the control program stored in memory part 29b, and it is possible to function as paper jam information acquiring part 200, paper jam information analyzing part 110, and feed-setting changing part 230.

Figure 8:
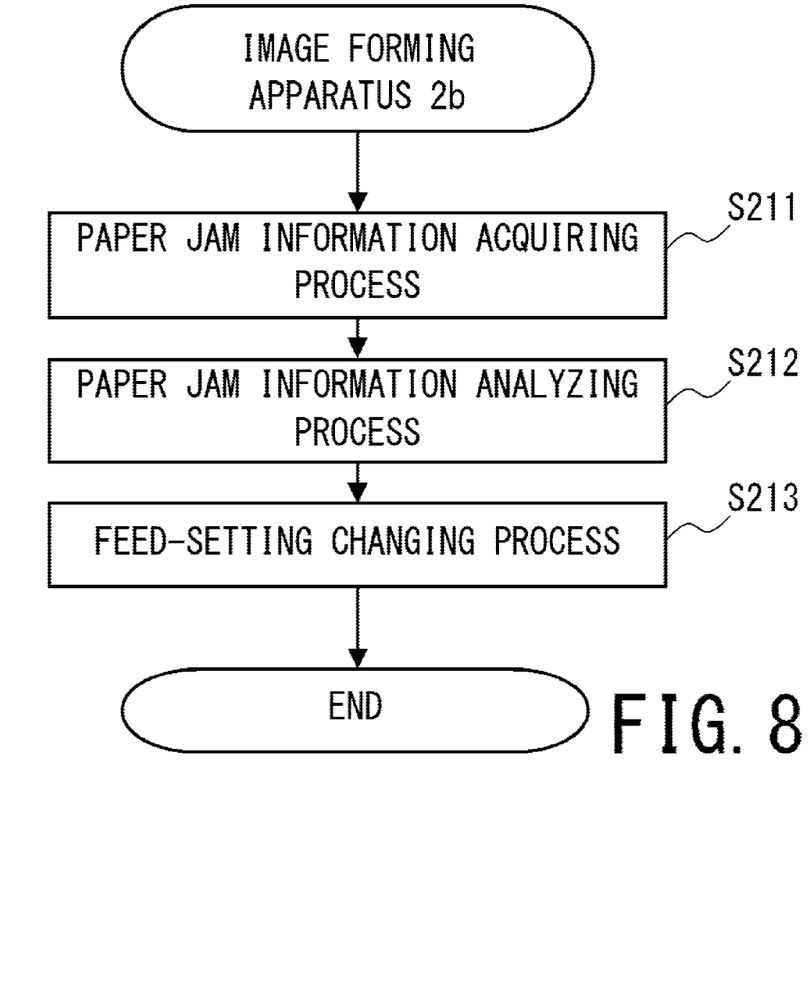
FIG. 8 is a flow chart of a paper jam feed-setting changing process according to the second embodiment of the present disclosure.

Here, as refer to FIG. 8, a paper jam feed-setting changing process in the second embodiment in the present disclosure is explained in detail for each step. In addition, for these processes, a similar process as the first embodiment may also be executed, similarly. By executing this paper jam feed-setting changing process using hardware resources, it becomes possible to make image forming apparatus 2b perform the image forming method in the present embodiment.

(Step S211)

Firstly, paper jam information acquiring part 200 performs a paper jam information acquiring process. Paper jam information acquiring part 200 acquires paper jam information 300 for feeding part 24 and stores it in memory part 29.

(Step S212)

Then, paper jam information analyzing part 110 performs a paper jam information analyzing process. Paper jam information analyzing part 110 analyzes paper jam information 300 stored in memory part 29 with reference to threshold setting 310. Then, if the feed number of recording paper 50 of the paper feed source where the paper jam occurred is greater than or equals to the specific threshold and another paper feed source with the same settings of recording paper 50 is present, paper jam information analyzing part 110 generates feed-setting changing information 320 instructed to change into the respective paper feed source and stores it in memory part 29.

(Step S213)

Then, feed-setting changing part 230 performs a feed-setting changing process. Feed-setting changing part 230 changes the feed-setting of feeding part 24 corresponding to feed-setting changing information 320 stored in memory part 29. By the above-mentioned, the paper jam feed-setting process according to the present embodiment is ended.

With a configuration in this way, even if it is stand-alone image forming apparatus 2b, the feed-setting can be optimized as corresponded to paper jam information 300 and threshold setting 310 as sheet paper cassette 40 or detachable tray 41 being effectively-used. The frequency of a paper jam can be reduced as a result.

In addition, for example, it can be possible, as not concerned with the presence or absence of paper jam occurrence, change of sheet paper cassette 40 or detachable tray 41 for a paper feed source is performed by comparing with the value of the feed counter and the threshold at each specific number of sheets in the feed counter.

Other Embodiments

In the above-mentioned the first and the second embodiment, an example that confirms the feed counter of detachable tray 41 is explained. However, a feed counter may be confirmed only about sheet paper cassette 40. Also, changing the paper feed source only between the plurality of sheet paper cassettes 40 is possible.

Here, since quantity of the recording paper held in detachable tray 41 is fewer than that of sheet paper cassette 40, generally, replacement frequency of recording paper 50 in detachable tray 41 is higher than sheet paper cassette 40. Therefore, as configured in this way, it becomes unnecessary to frequently-replace recording paper 50 for detachable tray 41. Therefore, a usability can be received for a user.

Also, replacement frequency of components is different between sheet paper cassette 40 and detachable tray 41. Generally, as for detachable tray 41, the replacement frequency of components serving as high. However, when the paper in which the load to components, such as a roller, is very small in case of hand feed is used, the replacement frequency of components for detachable tray 41 becomes lower. Also, when the roller, or the like, which is hard to be deterred is used because of a presupposition that the direction of detachable tray 41 passes various papers, a possibility that exchange time will be prolonged rather than sheet paper cassette 40 is also considered. Therefore, by changing a paper feed source only between sheet paper cassettes 40, it becomes unnecessary to consider the difference of the maintenance period of the components between detachable tray 41 and sheet paper cassette 40, and usability becomes better.

In addition, these settings may be changed by the administrator, and which sheet paper cassette 40 or detachable tray 41 are used for selecting the paper feed source can also be setup.

Also, in above-mentioned embodiments, it is explained an example that the type of recording paper 50 is set in advance to memory part 29 in image forming apparatus 2. However, each sheet paper cassette 40 and detachable tray 41 may have a media sensor, and a type of recording paper 50 may be specified. That means, for example, the media sensor specifies the type of recording paper 50 by thickness, hardness, roughness, weight, or the like, of recording paper 50. Thus, the media sensor may be a photo sensor, an ultrasonic sensor, a piezo sensor, or the like. Thereby, from each sheet paper cassette 40 or detachable tray 41, it counts how many sheets paper is fed for each type of recording paper 50, and it becomes possible to change the paper feed source, accurately, with the threshold for each type.

In this case, the deterioration factor of sheet paper cassette 40 or detachable tray 41 may be included in threshold setting 310. For example, this deterioration factor may set the coefficient of recycled paper to 0.8 if the coefficient of fine quality paper is set to 1. In this case, if the initial threshold is 10000 sheets for example and the number of recycled paper is 2000 in case of completing 5000 sheets printing, paper jam information analyzing part 110 may change the threshold into 9600, which deducted 2000*(1.0–0.8)=400 from 10000. Also, the deterioration factor may be individually calculated as corresponded to the use condition of each image forming apparatus 2. Also, the deterioration factor may be determined based on the result of the printing-proof examination before shipment, or the like. Also, server 1, or the like, may calculate the deterioration factor by collecting the data of the use condition of each image forming apparatus 2. In this case, for example, if data of a plurality of image forming apparatuses 2 in the same office is collected, an environmental difference becomes small, and a comparatively-accurate coefficient can be obtained. Also, the deterioration factor may be calculated with the value for every model or destination. Furthermore, corresponding to a using state, the deterioration factor may be changed, dynamically.

Also, in the above-mentioned embodiment, an example, which the feed-setting is included in feed counter information 330 in memory part 29, is shown. However, it is not limited to this configuration. For example, the microcontroller, or the like, may be provided in feeding part 24, and feeding part 24 itself may be stored the feed-setting and feed counter information 330. Also, settings of the paper feed source may be directly stored in a recording media of the microcontroller, or the like, in feeding part 24. Also, feeding part 24 can switch a paper feed source, mechanistically, and it may directly-acquire a state of the actuator, or the like, by a sensor as a feed-setting. As configured in this way, even if it is an image forming apparatus that performs intelligent paper feeding control or changes a paper feed source, mechanically, the paper feed source can be changed, flexibly.

Also, the present disclosure is also applicable to a kind of sheet conveying apparatus other than an image forming apparatus. That is, it may be configured the network scanner having a plurality of switchable paper feed sources, the separate scanner connected with a server via USB, or the like.

Also, the configuration and operation of the above-mentioned embodiment are examples, it cannot be overemphasized that it can suitably-change and can execute in the range that does not deviate from the aim of the present disclosure.

What is claimed is:

1. An image forming system having an image forming apparatus and a server that performs management of the image forming apparatus, wherein
the image forming apparatus comprises:
   a feeding part that includes a plurality of paper feed sources holding a recording paper;
   a paper jam information acquiring part that acquires paper jam information about a paper jam in the feeding part;
   a paper jam information transmitting part that transmits the paper jam information acquired by the paper jam information acquiring part to the server;
   a feed-setting changing information receiving part that receives feed-setting changing information transmitted by the server; and
   a feed-setting changing part that modifies a feed-setting of the feeding part corresponding to feed-setting changing information received by the feed-setting changing information receiving part;
the server comprises:
   a paper jam information receiving part that receives the paper jam information transmitted from the paper jam information transmitting part in the image forming apparatus;
   a paper jam information analyzing part that
      analyzes the paper jam information received by the paper jam information receiving part,
      determines whether a feed number of the recording paper in a paper feed source where the paper jam occurred corresponds to a threshold, and
      when the feed number of the recording paper in the paper feed source where the paper jam occurred corresponds to a threshold and when another paper feed source with same settings of the recording paper is present, generates the feed-setting changing information, wherein the feed-setting changing information instructs to change paper feeding to the another paper feed source; and
   a feed-setting changing information transmitting part that transmits the feed-setting changing information generated by the paper jam information analyzing part to the image forming apparatus;

the threshold comprises a ratio of a feed counter of the paper feed source where the paper jam occurred to a feed counter of the another paper feed source;

the feed counter of the paper feed source is determined from the number of times that a recording paper has been fed from the paper feed source; and the feed counter of the another paper feed source is determined from the number of times that a recording paper has been fed from the another paper feed source.

2. The image forming system according to claim 1, wherein the paper jam information analyzing part generates the feed-setting changing information instructing the change of paper feeding to the another paper feed source only when the feed number corresponds to the threshold comprising the ratio and is greater than or equal to a threshold number of sheets fed from the paper feed source.

3. The image forming system according to claim 1, wherein the plurality of paper feed sources includes a sheet paper cassette and a detachable tray;

the paper jam information identifies the paper feed source in which the paper jam occurred, wherein the paper feed source identified can independently be the sheet paper cassette and the detachable tray; and when the paper jam information identifies the sheet paper cassette as the paper feed source in which the paper jam occurred, the paper jam information analyzing part uses a lower ratio as the threshold than when the paper jam information identifies the detachable tray as the paper feed source in which the paper jam occurred.

4. The image forming system according to claim 1, wherein the image forming apparatus identifies a type of recording paper fed by each of the plurality of paper feed sources;

the type of recording paper in each of the plurality of paper feed sources can independently comprise any of a plurality of recording paper types having different deterioration factors; and the paper jam information analyzing part, for each of the plurality of paper feed sources, changes the threshold according to the deterioration factor of the type of recording paper being held.

5. The image forming system according to claim 1, wherein the paper jam information analyzing part analyzes the paper jam information acquired from a plurality of image forming apparatuses and changes the threshold as matching to a user environment.

6. The image forming system according to claim 1, wherein the plurality of paper feed sources includes a detachable tray and a plurality of sheet paper cassettes;

the paper jam information identifies the paper feed source in which the paper jam occurred, wherein the identified paper feed source can independently be the detachable tray and a sheet paper cassette of the plurality of sheet paper cassettes; and when the paper jam information identifies the sheet paper cassette as the paper feed source in which the paper jam occurred, the paper jam information analyzing part is configured to exclude the detachable tray from consideration as the another paper feed source for said change of paper feeding and does not include a feed counter of the detachable tray in the ratio of the threshold.

7. The image forming system according to claim 1, wherein the image forming apparatus identifies a type of recording paper fed by each of the plurality of paper feed sources;

the type of recording paper can independently comprise any of a plurality of recording paper types; and each of said feed counters is calculated based on the number of times that a recording paper has been fed and the type of recording paper fed by the respective paper feed source.

8. A server that manages an image forming apparatus, comprising:

a paper jam information receiving part that receives paper jam information transmitted from the image forming apparatus;

a paper jam information analyzing part that analyzes the paper jam information received by the paper jam information receiving part;

determines whether a feed number of a recording paper in a paper feed source where a paper jam occurred corresponds to a threshold; and when the feed number of the recording paper of the paper feed source where the paper jam occurred corresponds to the threshold and when another paper feed source with same settings of the recording paper is present, generates feed-setting changing information instructing to change paper feeding to the another paper feed source; and a feed-setting changing information transmitting part that transmits the feed-setting changing information generated by the paper jam information analyzing part to the image forming apparatus, wherein the threshold comprises a ratio of a feed counter of the paper feed source where the paper jam occurred to a feed counter of the another paper feed source;

the feed counter of the paper feed source is determined from the number of times that a recording paper has been fed from the paper feed source; and the feed counter of the another paper feed source is determined from the number of times that a recording paper has been fed from the another paper feed source.

9. The server according to claim 8, wherein the paper jam information analyzing part generates the feed-setting changing information instructing to change paper feeding to the another paper feed source only when the feed number corresponds to the threshold comprising a ratio and is greater than or equal to a threshold number of sheets fed by the paper feed source.

10. The server according to claim 8, wherein the server receives, from the image forming apparatus, information regarding a plurality of paper feed sources includes a sheet paper cassette and a detachable tray; and the paper jam information identifies the paper feed source in which the paper jam occurred, wherein the paper feed source identified can independently be the sheet paper cassette and the detachable tray; and when the paper jam information identifies the sheet paper cassette as the paper feed source in which the paper jam occurred, the paper jam information analyzing part uses a lower ratio as the threshold than when the paper jam information identifies the detachable tray as the paper feed source in which the paper jam occurred.

11. The server according to claim 8, wherein the paper jam information analyzing part determines a type of recording paper fed by each of a plurality of paper feed sources of the image forming apparatus;

the type of recording paper in each of the plurality of paper feed sources can independently comprise any of a plurality of recording paper types having different deterioration factors; and the paper jam information analyzing part, for each of the plurality of paper feed sources, changes the threshold according to the deterioration factor of the type of recording paper being held.

12. The server according to claim 8, wherein
the paper jam information analyzing part analyzes the paper jam information acquired from a plurality of image forming apparatuses and changes the threshold as matching to a user environment.

13. The server according to claim 8, wherein
the plurality of paper feed sources includes a detachable tray and a plurality of sheet paper cassettes;
the paper jam information identifies the paper feed source in which the paper jam occurred, wherein the identified paper feed source can independently be the detachable tray and a sheet paper cassette of the plurality of sheet paper cassettes; and
when the paper jam information identifies the sheet paper cassette as the paper feed source in which the paper jam occurred, the paper jam information analyzing part is configured to exclude the detachable tray from consideration as the another paper feed source for said change of paper feeding and does not include a feed counter of the detachable tray in the ratio of the threshold.

14. An information processing method executed by a server that manages an image forming apparatus comprising the steps of:
receiving paper jam information transmitted from the image forming apparatus;
analyzing the received paper jam information;
determining whether a feed number of a recording paper in a paper feed source where a paper jam occurred corresponds to a threshold;
when the feed number of the recording paper in the paper feed source where a paper jam occurred corresponds to a threshold and when another paper feed source with same settings of the recording paper is present, generating feed-setting changing information to instruct a change paper feeding to the another paper feed source; and
transmitting the generated feed-setting changing information to the image forming apparatus;
wherein
the threshold comprises a ratio of a feed counter of the paper feed source where the paper jam occurred to a feed counter of the another paper feed source;
the feed counter of the paper feed source is determined from the number of times that a recording paper has been fed from the paper feed source; and
the feed counter of the another paper feed source is determined from the number of times that a recording paper has been fed from the another paper feed source.

15. The information processing method according to claim 14, wherein
the server generates the feed-setting changing information instructing the change of paper feeding to the another paper feed source only when the feed number corresponds to the threshold comprising a ratio and is greater than or equal to a threshold number of sheets fed by the paper feed source.

16. The information processing method according to claim 14, wherein
the server receives, from the image forming apparatus, information regarding a plurality of paper feed sources having a sheet paper cassette and a detachable tray, wherein the paper jam information identifies the paper feed source in which the paper jam occurred, wherein the paper feed source identified can independently be the sheet paper cassette and the detachable tray, and
when the paper jam information identifies the sheet paper cassette as the paper feed source in which the paper jam occurred, the server uses a lower ratio as the threshold than when the paper jam information identifies the detachable tray as the paper feed source in which the paper jam occurred.

17. The information processing method according to claim 14, comprising
determining a type of recording paper fed by each of the plurality of paper feed sources, wherein the type of recording paper in each of the plurality of paper feed sources can independently comprise any of a plurality of recording paper types having different deterioration factors; and
changing, for each of the plurality of paper feed sources, the threshold according to the deterioration factor of the type of recording paper being held.

18. The information processing method according to claim 14, comprising
analyzing the paper jam information acquired from a plurality of image forming apparatuses, and
changing the threshold as matching to a user environment.

19. The information processing method according to claim 14, wherein
the plurality of paper feed sources includes a detachable tray and a plurality of sheet paper cassettes;
the paper jam information identifies the paper feed source in which the paper jam occurred, wherein the identified paper feed source can independently be the detachable tray and a sheet paper cassette of the plurality of sheet paper cassettes; and
when the paper jam information identifies the sheet paper cassette as the paper feed source in which the paper jam occurred, the paper jam information analyzing part does not consider the detachable tray as the another paper feed source for said change of paper feeding and does not include a feed counter of the detachable tray in the ratio of the threshold.

* * * * *